United States Patent
Gilstring

(10) Patent No.: US 8,336,471 B2
(45) Date of Patent: Dec. 25, 2012

(54) ARRANGEMENT OF A SEED METERING DEVICE ON AN AGRICULTURAL MACHINE

(75) Inventor: Gert Gilstring, Väderstad (SE)

(73) Assignee: Väderstad-Verken AB, Väderstad (SE)

( * ) Notice: Subject to any disclaimer, the term of this patent is extended or adjusted under 35 U.S.C. 154(b) by 0 days.

(21) Appl. No.: 13/129,542

(22) PCT Filed: Oct. 20, 2009

(86) PCT No.: PCT/SE2009/051193
§ 371 (c)(1),
(2), (4) Date: May 16, 2011

(87) PCT Pub. No.: WO2010/059101
PCT Pub. Date: May 27, 2010

(65) Prior Publication Data
US 2011/0219994 A1    Sep. 15, 2011

(30) Foreign Application Priority Data
Nov. 18, 2008   (SE) .................................... 0802417

(51) Int. Cl.
*A01C 7/04*    (2006.01)
(52) U.S. Cl. ...................................................... 111/185
(58) Field of Classification Search ............... 111/149, 111/170, 177–185
See application file for complete search history.

(56) References Cited

U.S. PATENT DOCUMENTS

| | | |
|---|---|---|
| 3,680,737 A | 8/1972 | Zagotta et al. |
| 3,698,332 A | 10/1972 | McCallum |
| 3,731,842 A | 5/1973 | Schlegel |
| 4,037,755 A | 7/1977 | Reuter |
| 4,399,757 A | 8/1983 | Maury |
| 4,450,979 A | 5/1984 | Deckler |
| 4,915,258 A | 4/1990 | Olson |
| 6,142,086 A | 11/2000 | Richard |
| 2004/0134399 A1 | 7/2004 | Stephens et al. |
| 2008/0053352 A1 | 3/2008 | Friestad |

FOREIGN PATENT DOCUMENTS

| | | |
|---|---|---|
| SE | 0700529 | 10/2008 |
| WO | 2008/108732 | 9/2008 |

OTHER PUBLICATIONS

International Search Report issued on Feb. 18, 2010 in International Application No. PCT/SE2009/051193 filed Oct. 20, 2009.

*Primary Examiner* — Christopher J. Novosad
(74) *Attorney, Agent, or Firm* — Drinker Biddle & Reath LLP

(57) ABSTRACT

Agricultural machine embracing at least one drilling unit including a support device as well as a seed metering device. The drilling unit is movably connected with a structural member embraced by the agricultural machine. The seed metering device is fixedly connected with the support device of the drilling unit and the seed metering device includes a chamber for seeds arranged to be supplied with a positive pressure where the seed metering element constitutes a wall limiting the chamber and in which holes or recesses are arranged. The holes/recesses connect the chamber with the surroundings, with the purpose of, by the pressure difference developed hereby, attaching and transporting seeds at the holes/recesses of the seed metering element. A seed metering line has an inlet in the chamber, with the purpose of, by the positive pressure in the chamber, creating an air flow for the transportation of the seeds from the chamber through the seed metering line to a drill furrow.

19 Claims, 10 Drawing Sheets

A - A

_US 8,336,471 B2_

ARRANGEMENT OF A SEED METERING DEVICE ON AN AGRICULTURAL MACHINE

CROSS REFERENCE TO RELATED APPLICATIONS

This application is the National Stage of International Application No. PCT/SE2009/051193, filed Oct. 20, 2009, and claims benefit of Swedish Application No. 0802417-6, filed Nov. 18, 2008, both of which are herein incorporated by reference in their entirety.

TECHNICAL FIELD

The invention relates to an agricultural machine according to the preamble of claim 1.

BACKGROUND

An agricultural machine of the planter type is driven, usually towed by a tractor, across the soil that is to be sown, and embraces a plurality of drilling units distributed in the lateral direction of the machine, each one of which drilling units is arranged to form a drill furrow in the direction of travel of the machine and, by a special device, place a row of seeds in the drill furrow. In order to provide good opportunities for the crops and the harvest, it is important that the seeds are placed at a constant, uniform distance from each other. There is also a desire to be able to keep a high speed of motion upon sowing, since the time consumption decreases thereby.

U.S. Pat. No. 4,450,979 discloses a seed metering device for a planter having drilling units, each one of which has two rotatable discs inclined in opposite directions for the formation of a drill furrow, which drilling units can move vertically in relation to the frame of the planter. The seed metering devices, each one of which is fixedly connected with a respective drilling unit, are individually arranged to distribute one seed at a time to the respective drill furrow. The seed reception on the seed metering element is effected by a positive pressure on the seed side of the seed metering element. The positive pressure is separated by a brush seal as well as a baffle seal from the area where the seed releases from the seed metering element to fall down through a seed chute to the drill furrow only by means of the gravity.

In solutions of this type, disclosed in the document above, not infrequently a non-uniform distance distribution of seeds along the drill furrow is obtained, particularly upon relatively high speeds of the machine. The non-uniform distribution is caused by the fact that the seed is released at an initial speed from the seed metering element to fall by the gravity to the seed chute and through the same slide down to the drill furrow in the ground. When the seed releases from the seed metering element, there is a variation of the initial speed of the seed toward the ground depending on the vertical motions of the drilling unit and thereby of the seed metering device when driving over the irregularities of the field. The variation of initial speed results in a variation of the transportation time of the seed from the seed metering element to the drill furrow.

SE0700529 shows a solution where, by varying the speed of rotation of the seed metering element depending on the vertical motions of the seed metering device, the variation of initial speed is decreased.

Another factor of variation of the transportation time is that certain seeds bounce against the wall of the seed chute, on one hand depending on the vertical motions of the seed chute when driving over the irregularities of the field, and on the other hand depending on a variation of the fall angle of the seed, in the free fall, down into the seed chute. Variations of the transportation time from the seed metering device to the drill furrow results in a non-uniform distance distribution of seeds along the drill furrow.

Such problems described above with non-uniform distance distribution of seeds in the drill furrow may imply that the speed of motion upon sowing has to be kept relatively low

SUMMARY

One object of the invention is to decrease the time consumption upon sowing by an agricultural machine of the planter type.

Another object of the invention is to allow higher speed of motions upon sowing by an agricultural machine of the planter type.

Another object of the invention is to provide a uniform distance positioning of seeds in the drill furrow by an agricultural machine of the planter type.

Another object of the invention is to provide a uniform distance positioning of seeds in the drill furrow by an agricultural machine of the planter type, also upon relatively high speeds of the agricultural machine.

Said objects are attained by an agricultural machine of the kind indicated by way of introduction, the seed metering line having an inlet in the chamber with the purpose of, by said positive pressure in the chamber, creating an air flow for the transportation of the seeds from the chamber through the seed metering line to the drill furrow.

By utilizing the positive pressure that creates a pressure difference for the reception and trapping of the seeds on the seed metering element to create an air flow in the seed metering line, a faster seed transportation from the seed metering element to the drill furrow is allowed.

The invention involves that the variation of the vertical speed of the seed metering device affects the distance distribution in the drill furrow in a very limited extent, since the fall distance and thereby fall time of the seed from that the seed releases from the seed metering element until the seed is accelerated by the air flow in through the inlet of the seed metering line can be made very short. Thereby, the variation of the initial speed of the different seeds into the inlet of the seed metering line as a consequence of the variation of the vertical speed of the drilling unit due to ground irregularities when driving on the field becomes minimal. Furthermore, the transportation speed of the seed in the seed metering line is many times greater than the disturbance from the superimposed vertical speed of the seed metering line due to the vertical speed of the drilling unit when driving over the field.

The invention involves also that known problems with bounces in the seed metering line are here considerably reduced since the air current controls the direction of motion of the seed into the inlet of the seed metering line and further through the seed metering line. This allows small inner dimensions of the seed metering line and a high seed speed. This combination leads in addition to the bounce angles in the seed metering line becoming small.

The invention involves furthermore that the air transport of seeds through the seed metering line, from the seed metering element in the seed metering device to the drill furrow, occurs very rapidly in comparison with the free fall. This transportation time may typical be as short as approx. 0.08 s. This short time means that the speed variation that different seeds have in an air-flow transportation by different factors such as the orientation of the seed in relation to the direction of the air current, the distance of the seed to the wall where the air speed is lower, the friction of the seed against the wall, etc., does not detrimentally affect the time interval between two seeds and thereby neither detrimentally affect the distance distribution in the drill furrow.

The inlet of the seed metering line is preferably arranged in close connection to a reception area on a seed-carrying side of the seed metering element. In this way, the fall distance and thereby fall time of the seed from that the seed releases from the seed metering element to the inlet of the seed metering line can be minimized.

Preferably, the seed metering line has an inlet direction that has an angle to a plane, which plane is tangent to the seed-carrying side of the seed metering element in the middle of the reception area, which angle is within an interval between 10° and 50°, preferably between 20° and 40°. Tests have shown that an angle of essentially 30° gives favorable results.

The seed metering element has preferably a rotationally symmetrical shape around a rotation axis, where the holes/recesses are distributed equidistantly from each other along a pitch circle concentric with the rotation axis.

Preferably, another angle between the inlet direction of the seed metering line projected on a plane that is tangent to the seed-carrying side of the seed metering element in the middle of the reception area and a line in said plane, which line is tangent to the pitch circle, is within an interval between 0° and 30°. Preferably, said angle is essentially 0°, whereby risks of disturbances to the motion of the seed from the seed metering element into the seed metering line are kept low by minimizing the change of direction of motion of the seed.

Preferably, the seed metering element has a portion in which the holes/recesses are arranged, the cross-section of which has another angle to the rotation axis at the pitch circle wherein the angle is within an interval between 45° and 135°. In this way, the seed metering element can be made conical at said portion. An angle less than 90° entails that the direction of motion of the seed can be kept as unaltered as possible from the seed metering element and further through the seed metering line. An angle greater than 90° means that the seed side of said portion forms a conical inner surface that simplifies agitation in the seed volume. If the angle instead is selected to be 90°, the seed metering element can be formed as a seed metering disc, which provides a simple and reliable design.

The seed metering device has preferably a pressure equalizing means at the reception area, preferably in the form of a roll, with the purpose of, at the reception area, eliminating the pressure difference across the holes/recesses and thereby also the force trapping the seed, as well as a supporting roll on the seed-carrying side of the seed metering element with the purpose of supporting the seed metering element and counteracting the compressive forces that the pressure equalizing means applies to the outside of the seed metering element, as well as preventing the seed-carrying side of the seed metering element from contacting the inlet of the seed metering line. In this way, the seed metering element can be arranged as close as possible to the inlet of the seed metering line without the seed metering element touching the inlet.

Preferably, the inlet of the seed metering line is arranged essentially flush with the rotation axis of the seed metering element. This position is advantageous since a seed that has released from the seed metering element right opposite the pressure equalizing means will fall, even if the fall distance is short, by the gravity, in the direction straight toward the inlet of the seed metering line.

Preferably, the inlet direction of the seed metering line extends essentially in a vertical plane.

The seed metering line has preferably an inlet and an outlet that are fixed in relation to each other.

Preferably, the seed metering line has a fixed arc-shape in relation to the supporting device and seed metering device of the drilling unit. In this way, the risk of bouncing is further reduced by the fact that the seed by the centrifugal force to a greatest possible extent will follow one side of the inner wall of the seed metering line, namely the side of the wall that is farthest away from the centre of the bending radius of said arc-shape.

Preferably, the seed metering line consists of an inlet portion, an outlet portion as well as a seed line that has an arc-shape in a plane in the entire length thereof, whereby the force pattern from the seed line on the seed can be kept relatively uniform during the entire transportation.

The seed line has preferably an arc-shape in a plane with a constant bend radius in the entire length thereof, alternatively an arc-shape in a plane with a continuously altered bend radius in the entire length thereof, which provides a small difference of the force pattern where a constant radius cannot be attained for other reasons, such as from considerations of space. Furthermore, the continuous alteration of the radius can be adapted to the acceleration of the seed through the seed line with the purpose of achieving a uniform force along the entire transportation, alternatively applying a retarding force close to the outlet.

DESCRIPTION OF THE FIGURES

The invention will be described in more detail below, reference being made to the drawings, in which.

DETAILED DESCRIPTION

Figure 1:
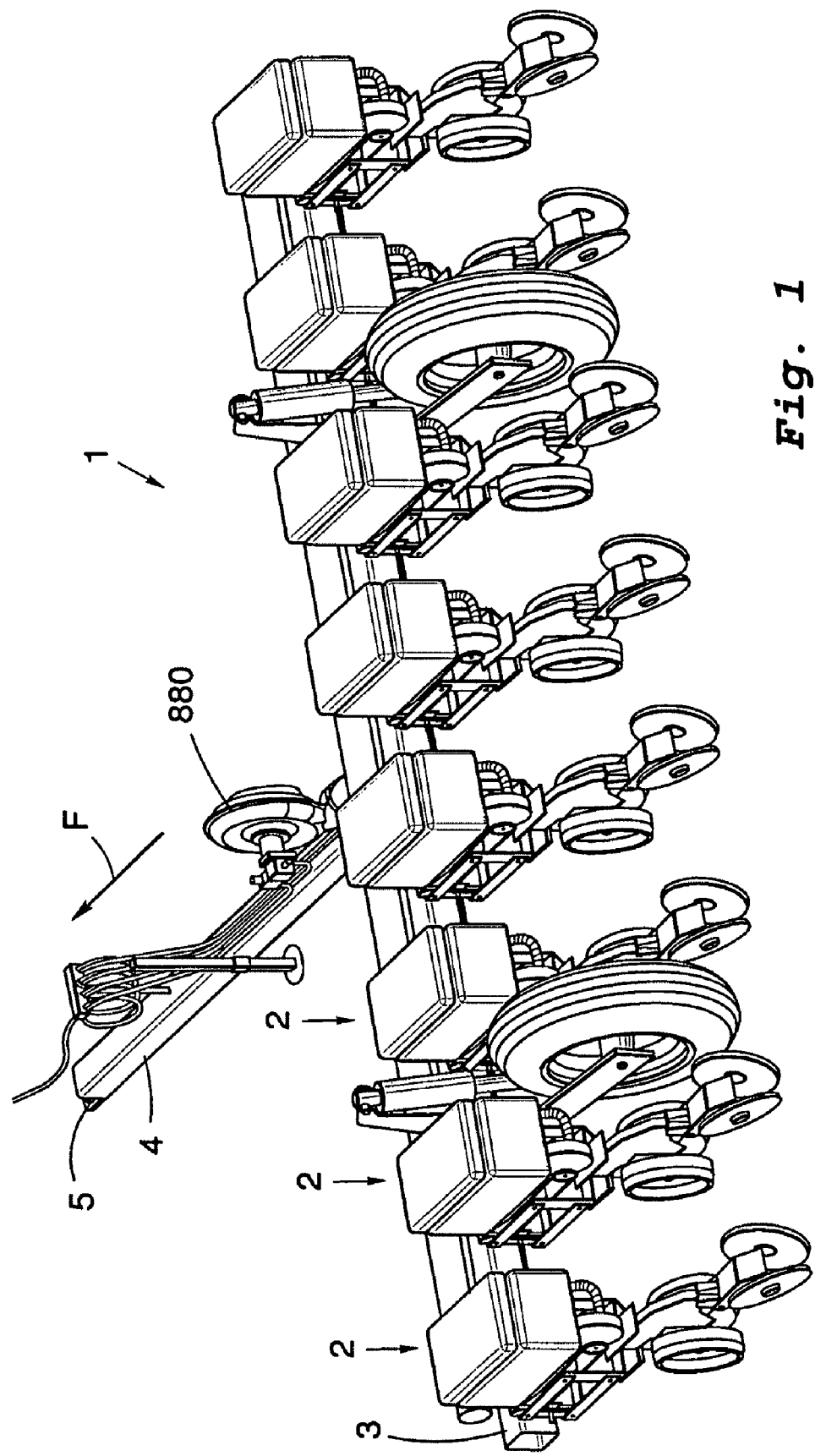
FIG. 1 shows a perspective view of a planter, as seen obliquely from above and obliquely from behind, according to an embodiment of the invention.

FIG. 1 shows a perspective view of an agricultural machine 1 in the form of a planter according to an embodiment of the invention. The planter 1 embraces a number of, in this example eight, drilling units 2, each one of which is attached to a structural member 3 comprising a transverse steel joist. The planter 1 is, by means of a fastening member 5 arranged at a free end of a longitudinal structural component 4, arranged to be coupled behind a traction vehicle and propagated in a direction indicated by the arrow F in FIG. 1. During the motion of the machine 1 across the soil that is to be sown, each one of the drilling units 2 is arranged to form a drill furrow in the direction of travel of the machine, in order to place one seed at a time along the drill furrow to form a row of seeds in the direction of travel F of the machine, as well as to close the drill furrow. A pressure-creating member, here in the form of a fan 880, is also shown.

Figure 2:
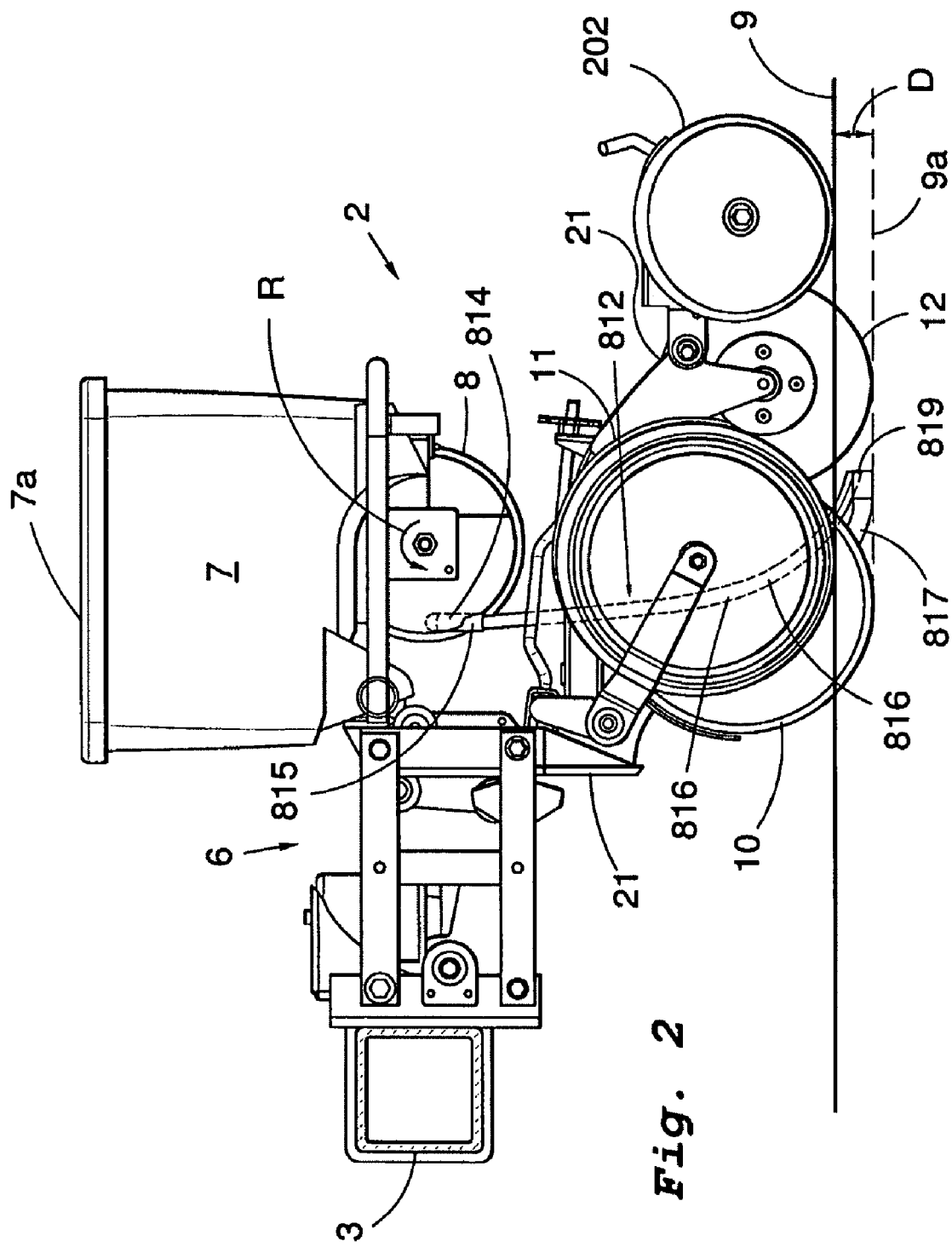
FIG. 2 shows a side view of a drilling unit comprised in the planter in FIG. 1.

FIG. 2 shows a side view of one of the drilling units 2. By means of a link device 6 described in more detail below, this is movably connected with the transverse structural member 3. The drilling unit 2 embraces a seed bin 7 that communicates with a seed metering device 8 described in more detail below and arranged to, via a seed metering line 812 (in FIG. 2 represented by broken lines), distribute one seed at a time to a drill furrow 9a in the ground 9.

The drilling unit 2 embraces a supporting device 21 to which the seed metering device 8 is fixedly connected, and on which a drill furrow-forming means, comprising two rotatable discs 10 (only one of which is visible in FIG. 2), is mounted and arranged to form the drill furrow 9a. In this example, the discs 10 are placed beside each other in essentially the same location in the intended direction of travel F of the machine. The discs 10 may, however, alternatively be mutually displaced in the direction of travel. The discs 10 are mutually angled and orientated so that they diverge mutually rearward and upward. When using the machine, the discs 10 are arranged to rotatingly partly penetrate down into the ground to an adjustable sowing depth D, and by said mutual divergence bring soil to the sides for the formation of the drill furrow 9a, a lower mouth or outlet 819 of the seed metering line 812 being situated immediately behind the engagement of the discs 10 with the ground 9. The mutual divergence rearward and upward of the discs 10 means that their periphery is as closest to each other in the area where they penetrate down into the ground.

A protecting member 817 keeps and protects the outlet 819 of the seed metering line against wear. The protecting member 817 may by itself also constitute an integrated part of the proper outlet 819. The protecting member 817 also forms the bottom of the drill furrow 9a. A pressing wheel 12 slows down the speed of the seed to zero in relation to the ground and presses down the seed into the bottom of the drill furrow.

The entire seed metering line 812 that brings the seed from the seed metering device 8 to the drill furrow 9a is described herein to consist of different portions such as, for instance, an inlet 814, a connection portion 815, a seed line 816 and an outlet 819. The seed metering line 812 may of course have another division of the included parts or consist of a single part for all functions. The seed line 816 may be manufactured from a hose or a pipe having a straight shape of suitable stiffness and intended to be held in place into the correct shape by points of attachment on the drilling unit 2. Alternatively, the seed line 816 has the correct shape as unmounted and may in this case have a greater stiffness. Preferably, the seed line 816 has a smooth inside with low friction, as well as a round cross-section of smallest possible inner diameter without seeds jamming in the seed line 816.

In this example, the drilling unit 2 embraces also here finishing members 202, not described in more detail, arranged to close the drill furrow 9a. The drilling unit 2 may also embrace preparing members not shown in the figures.

The drilling unit 2 is arranged to be carried by two supporting wheels 11, situated on each side of the pair of discs 10, the wheel shafts of the supporting wheels 11 being situated somewhat behind the disc shafts in the intended direction of travel F of the machine. More precisely, the supporting wheels 11 are situated on both sides of the pair of discs 10, as seen transverse to the intended direction of travel F of the agricultural machine 1, as well as in a vicinity to the respective disc 10, and are arranged to, during use, prevent soil from being thrown away from the drill furrow by the discs 10. According to prior art, the sowing depth D is adjustable by adjustment of the height of the supporting wheels 11 in relation to the discs 10.

Figure 3:
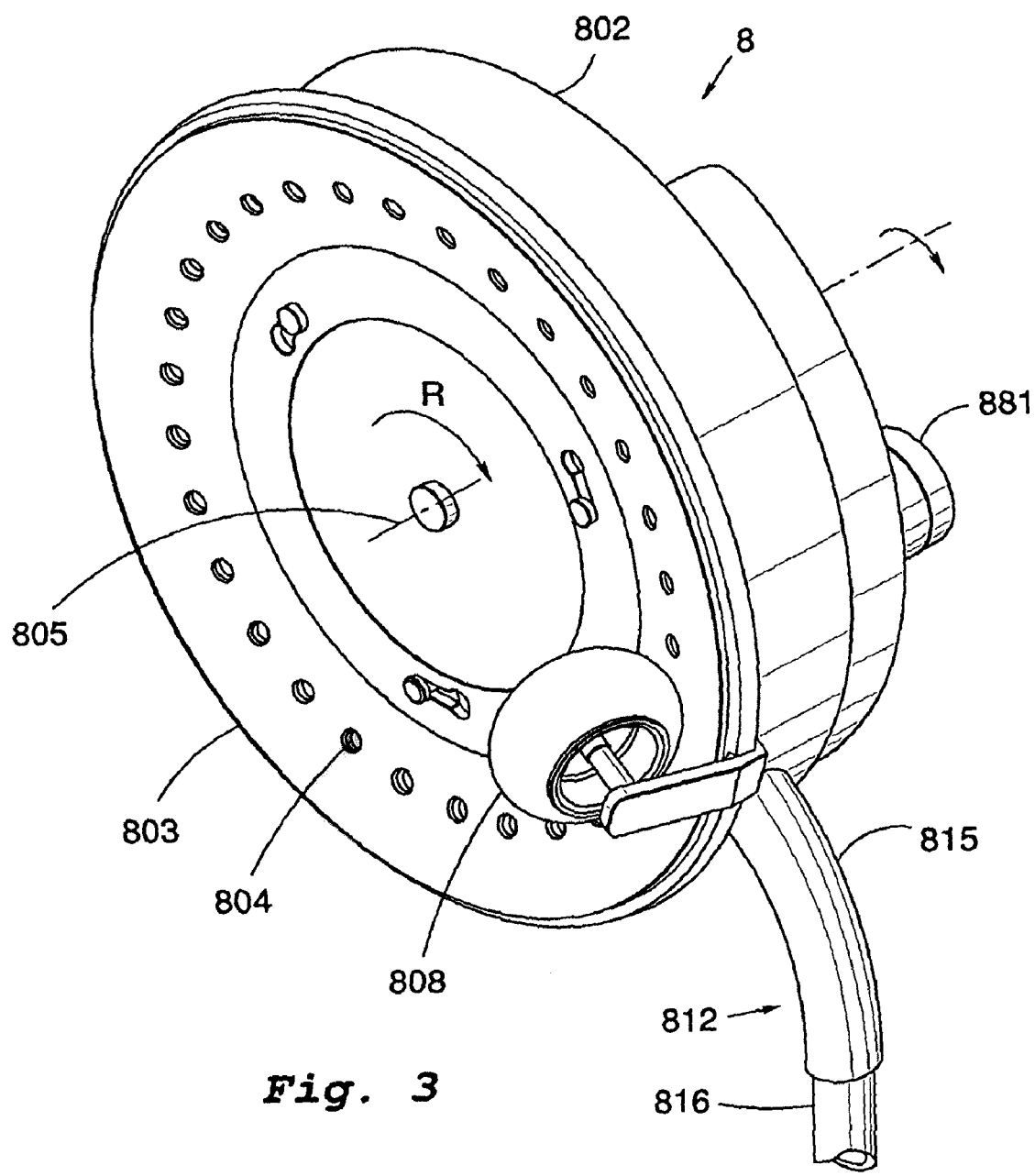
FIG. 3 shows a perspective view of a first embodiment of a seed metering device comprised in the drilling unit in FIG. 2.

FIG. 3 shows a perspective view of a seed metering device 8 according to a first embodiment. The seed metering device 8 embraces a casing 802 as well as a connection portion 815 of the seed metering line 812 turned outward from the casing, to which the seed line 816 is attached. The seed metering device 8 embraces a seed metering element 803, which is arranged in the casing 802.

The seed metering element 803 is arranged to, by means of a driving device, not described in more detail herein, rotate around a seed metering shaft or rotation axis 805, as is indicated in FIG. 3 by the arrow R. The seed metering element 803 is suitably detachably arranged at the seed distribution device 8 in order to allow a rapid and simple replacement, for instance, to a seed metering element adapted to another type of seed.

Figure 4:
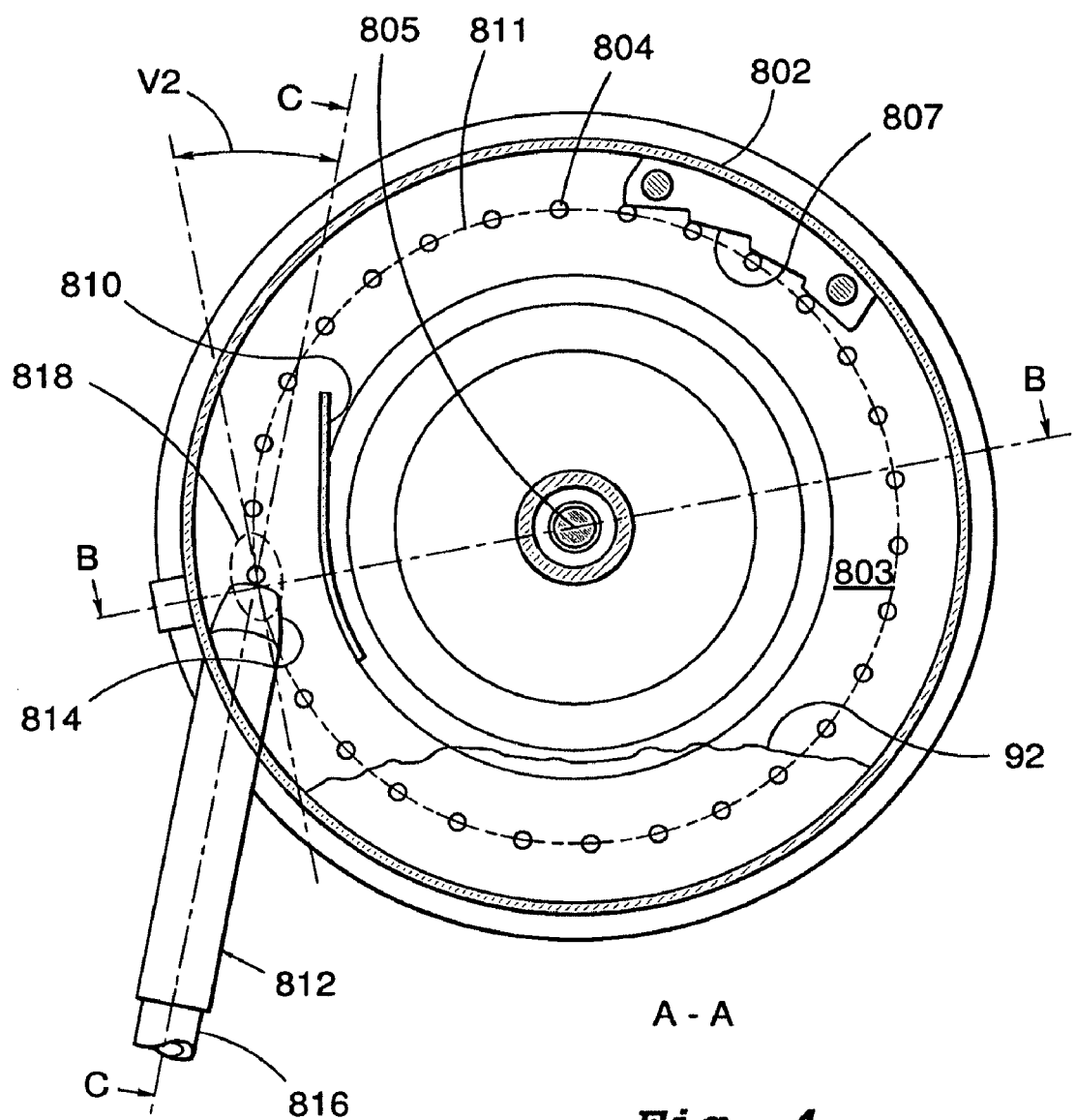
FIG. 4 shows a section A-A perpendicular to the rotation axis of the seed metering element of the first embodiment of the seed metering device according to FIG. 3.
Figure 5A:
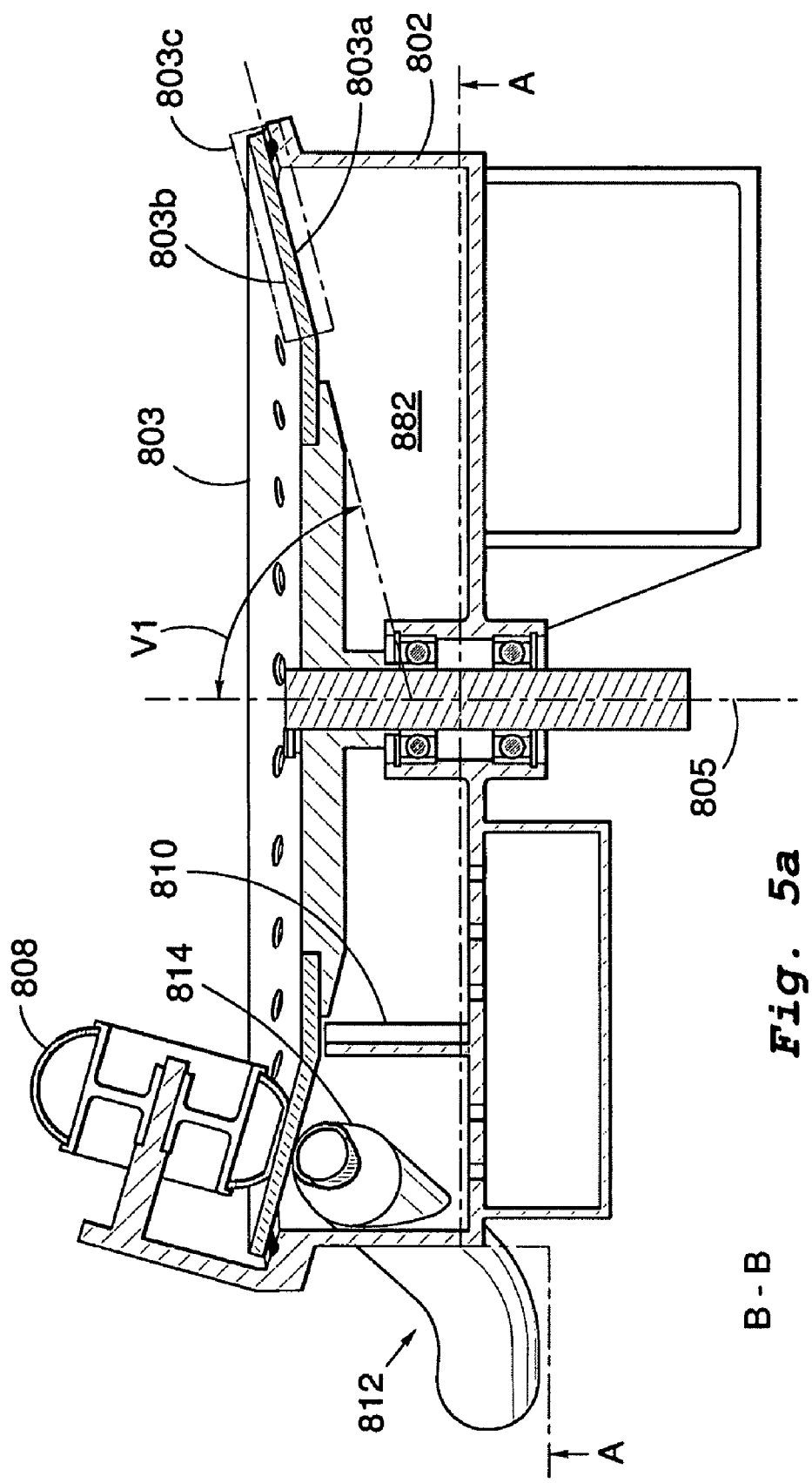
FIG. 5a shows a section B-B through the rotation axis of the seed metering element of the first embodiment of the seed metering device according to FIG. 3.
Figure 5B:
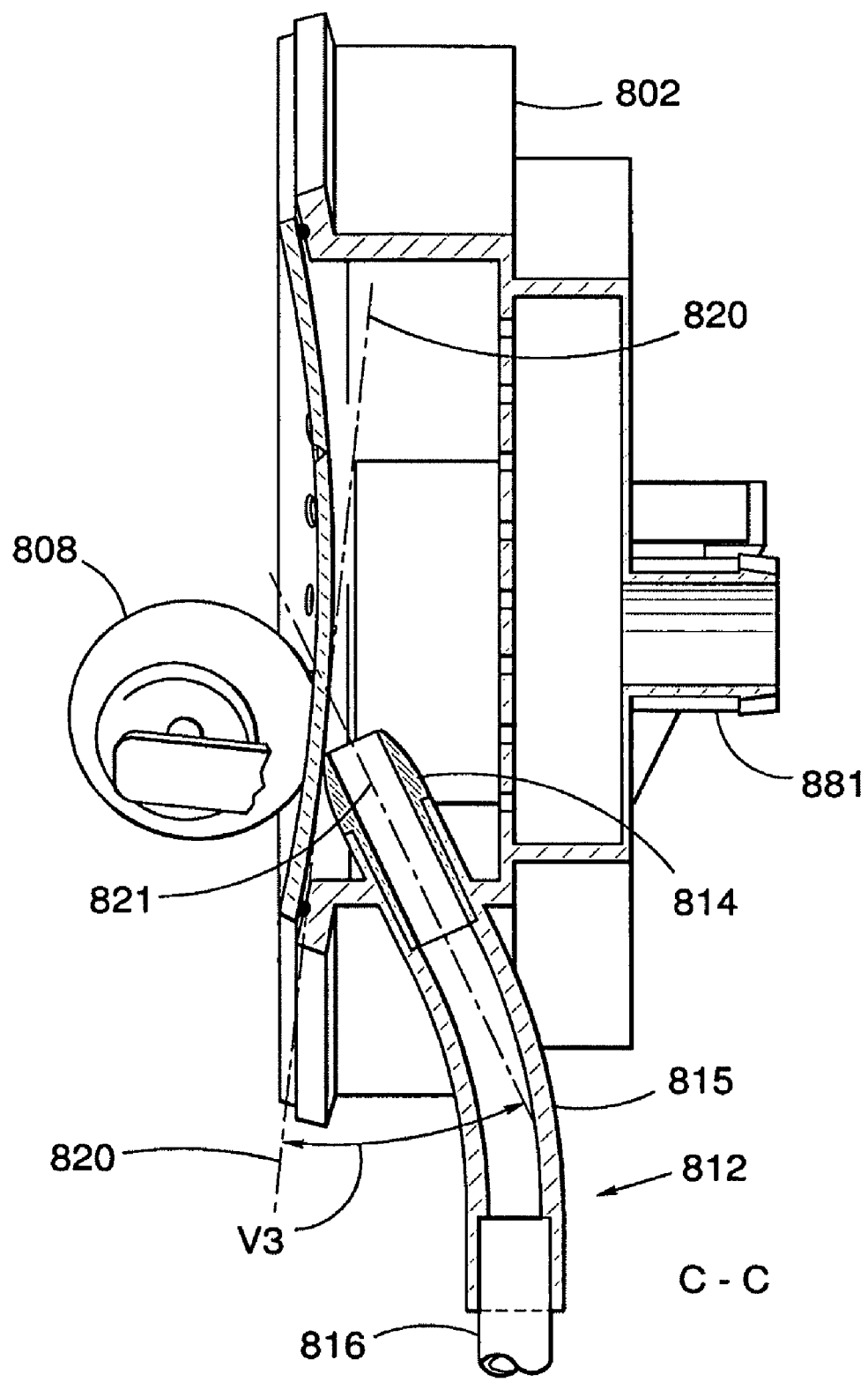
FIG. 5b shows a section C-C through the inlet of the seed metering line of the first embodiment of the seed metering device in FIG. 3.

Here, reference is made also to FIGS. 4, 5a and 5b. FIG. 4 is a section A-A in FIG. 5a. FIG. 5a is a section B-B in FIG. 4. FIG. 5b is a section C-C in FIG. 4. The seed metering device 8 comprises a chamber 882 limited by the inside of the casing 802, as well as by a seed-carrying inside 803a of the seed metering element 803. A positive pressure is created in said chamber 882 by the fan 880 (FIG. 1), connected via lines to a respective connection 881 on each seed metering device 8. In use, seeds are gravity fed from the seed bin 7 (FIG. 2) into the chamber 882 whereupon a small seed volume 92 is maintained in the chamber. Then, a positive pressure is created also in the seed bin 7, which because of that comprises a tight cover 7a (FIG. 2).

The inlet 814 and connection portion 815 of the seed metering line can be seen as an inlet portion. Here, the connection portion 815 constitutes an integrated part of the casing 802 that connects the inlet 814 arranged in the chamber 882 with the seed line 816. The seed line 816 is connected to the connection portion 815 outside the chamber 882. The inlet 814 and the connection portion 815 can also be an integrated part. The inlet 814 and the outlet 819 are fixed in relation to each other, for instance by the outlet 819 being fixed to the protecting member 817 or, via some part, fixed to the support device 21, as well as by the inlet being fixed to the seed metering device 8, which in turn is fixed to the support device 21. Furthermore, the outlet 819 may consist of the lower end of the seed line 816.

In this first embodiment, the seed metering element has 803 a rotationally symmetrical shape around the rotation axis 805. The seed metering element 803 constitutes a wall limiting the chamber 882 and has through holes 804 to receive and drop seed. The holes 804 are distributed equidistantly from each other along a pitch circle 811 concentric with the rotation axis 805 of the seed metering element. The cross-section of the seed metering element has a first angle V1 to the rotation axis thereof at a portion 803c at the pitch circle 811. The first angle V1 is here approx. 75° and should be within an interval between 45° and 135°. Here, the holes 804 are essentially shown cylindrical but they may also be formed with depressions on the seed-carrying side 803a of the seed metering element, which depressions also are called cells. The positive pressure in the chamber 882 creates a pressure difference between the inside 803a (the seed-carrying side) of the seed metering element 803 and the outside 803*b* thereof where it is normal air pressure. Accordingly, a pressure difference arises through the holes 804 of the seed metering element since the same connect the chamber 882 with the surroundings. The holes may, if desired, be replaced by recesses along the periphery of the seed metering element 803, where said recesses then form channels between the casing 802 and the seed metering element 803.

By surroundings, here is meant not necessarily only normally surrounding air pressure, but also an area with another air pressure, which however is below the positive pressure prevailing in the chamber 882 a corresponding pressure difference being attained, is included.

Thanks to the pressure difference, a seed is caught at each hole 804 when it passes the seed volume 92, from there the respective seed is transported by the rotation of the seed metering element 803 toward the inlet 814 of the seed metering line 812. The seed metering device 8 may be equipped with a double eliminator 807 that preferably is adjustable, here in the form of a cam, in order to remove extra seeds in a hole. Seeds on the seed metering element pass the double eliminator, which alternatively may consist of spikes, rolls or bristles, on their way to the inlet 814 of the seed metering line.

A pressure equalizing means 808, here in the form of a roll 808, on the non-seed-carrying outside 803*b* of the seed metering element, blocks the holes 804 within an area on the seed metering element 803, opposite an area 818 on the seed-carrying side 803*a* of the seed reception element, here denominated reception area. Within this area, the pressure difference is eliminated through the holes 804 and thereby also the force retaining the seed, a seed no longer being trapped to its hole and therefore easily being able to be received by the inlet 814 of the seed metering line.

The positive pressure in the chamber 882 creates simultaneously an air flow out of the seed metering device through the seed metering line 812 for the transportation of the seeds to the drill furrow 9*a*.

The seed metering device 8 has a partition wall 810 with the purpose of preventing loose seeds, for instance rejected from the double eliminator 807, in the chamber 882 from being captured by the inlet 814 of the seed metering line or knocking away, alternatively disturbing, a seed sitting in a hole 804 on its way to the inlet 814 of the seed metering line. The partition wall 810 is suitably open at the bottom in order to allow the seeds that for any reason have passed beside the inlet 814 of the seed metering line to be brought back to the seed volume 92.

The inlet 814 of the seed metering line is arranged in close connection to, and directed toward, said reception area 818 on the seed-carrying side 803*a* of the seed metering element. The inlet 814 of the seed metering line has an essentially circular cross-section, which has turned out to be favourable to an optimal air flow with small disturbances. The inlet 814 has furthermore an inlet direction 821 directed at a second angle V2 toward the tangent of the pitch circle 811 at the reception area 818, as well as a third angle V3 toward the surface of the seed metering element in the middle of the reception area 818.

More precisely, the second angle V2 is an angle between the inlet direction 821 projected on a plane 820 being tangent to the seed-carrying side 803*a* of the seed metering element in the middle of the reception area 818 and a line in said plane 820 that is tangent to the pitch circle 811. The second angle V2 is preferably smaller than 30°, here approx. 22°. More precisely, the third angle V3 is an angle between said inlet direction 821 and said plane 820

The first, second and third angle V1, V2, V3 may be varied within relatively wide limits in order to be optimized for an as uniform as possible distance distribution in the drill furrow, since the angles not only affect the function in the reception of the different seeds from the seed metering element 803 into the inlet 804 of the seed metering line but also affect the overall shape and length of the seed metering, wherein the angle between the inlet 814 of the seed metering and the seed line 816 as well as the curvature of the seed line 816 plays a decisive role. In order to further affect the above-mentioned, it is possible, in particular upon driving of the seed metering shaft 805 via a flexible shaft or by an electric motor (not shown), to arrange the rotation axis 805 of the seed metering element in another way than horizontal and/or perpendicular to the direction of travel of the planter F.

Figure 6:
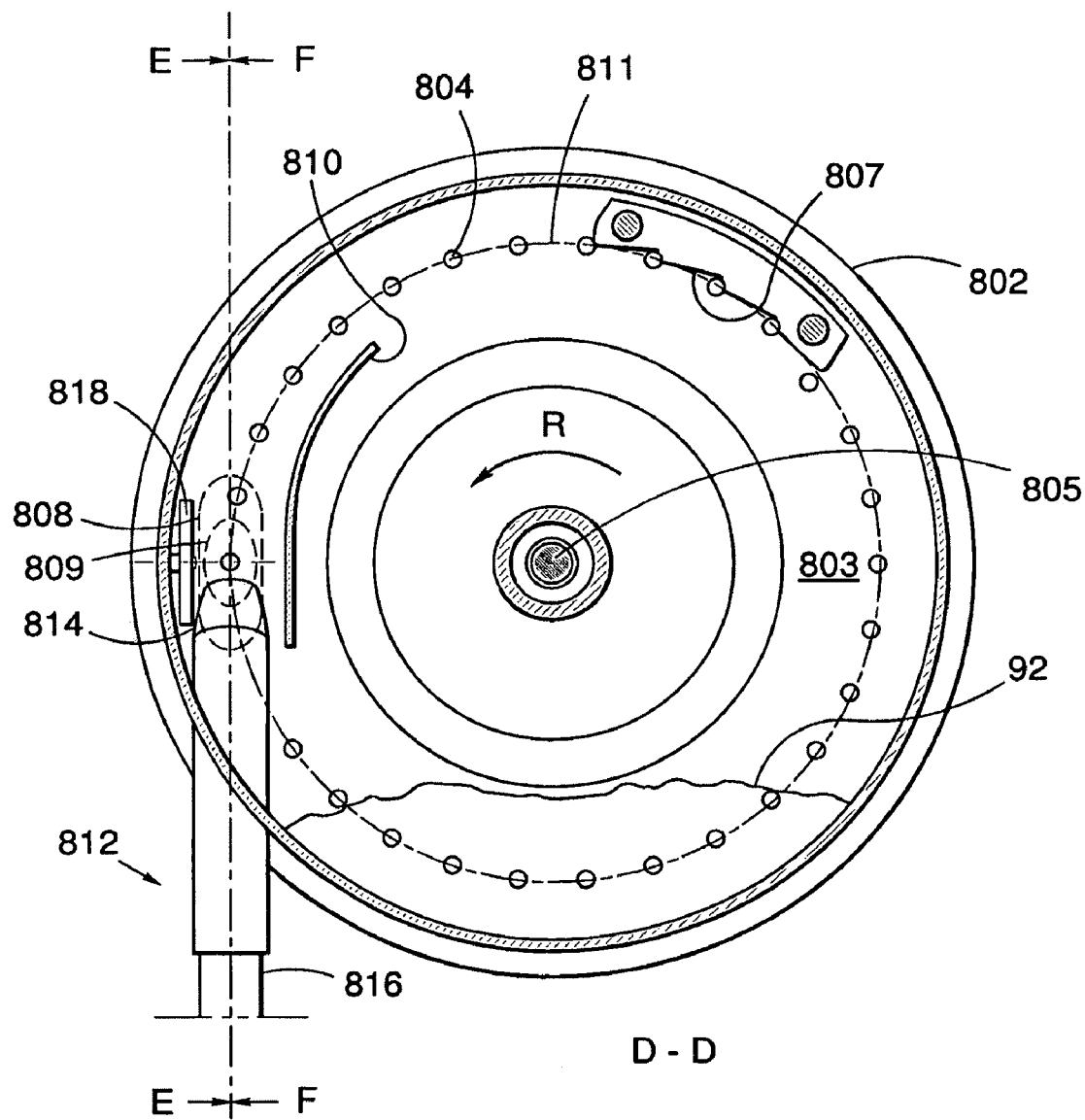
FIG. 6 shows a vertical section D-D, parallel to the direction of travel of the planter, of a second embodiment of a seed metering device comprised in the drilling unit in FIG. 2.
Figure 7A:
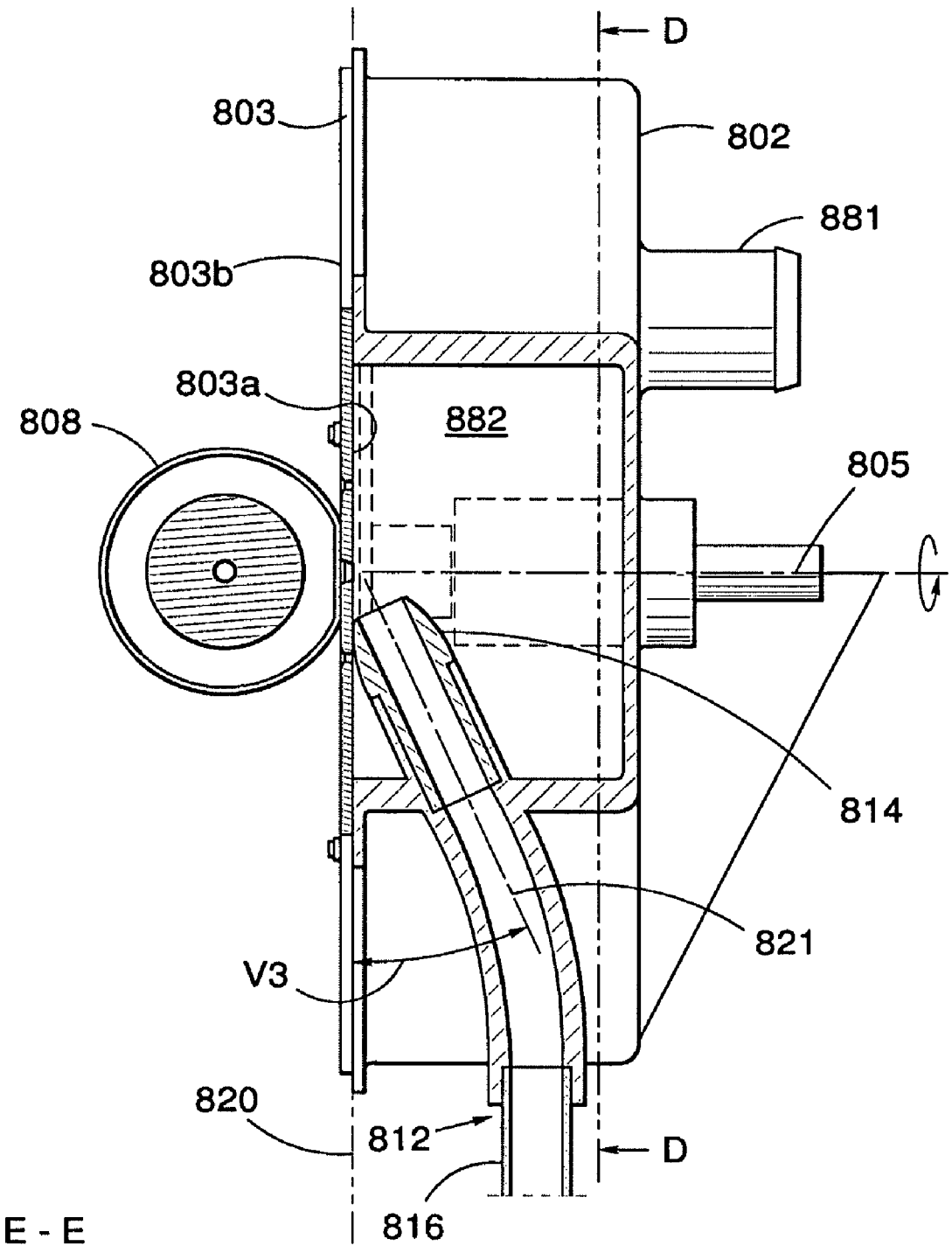
FIG. 7a shows a vertical section E-E, perpendicular to the direction of travel of the planter, of the second embodiment of the seed metering device in FIG. 6.
Figure 7B:
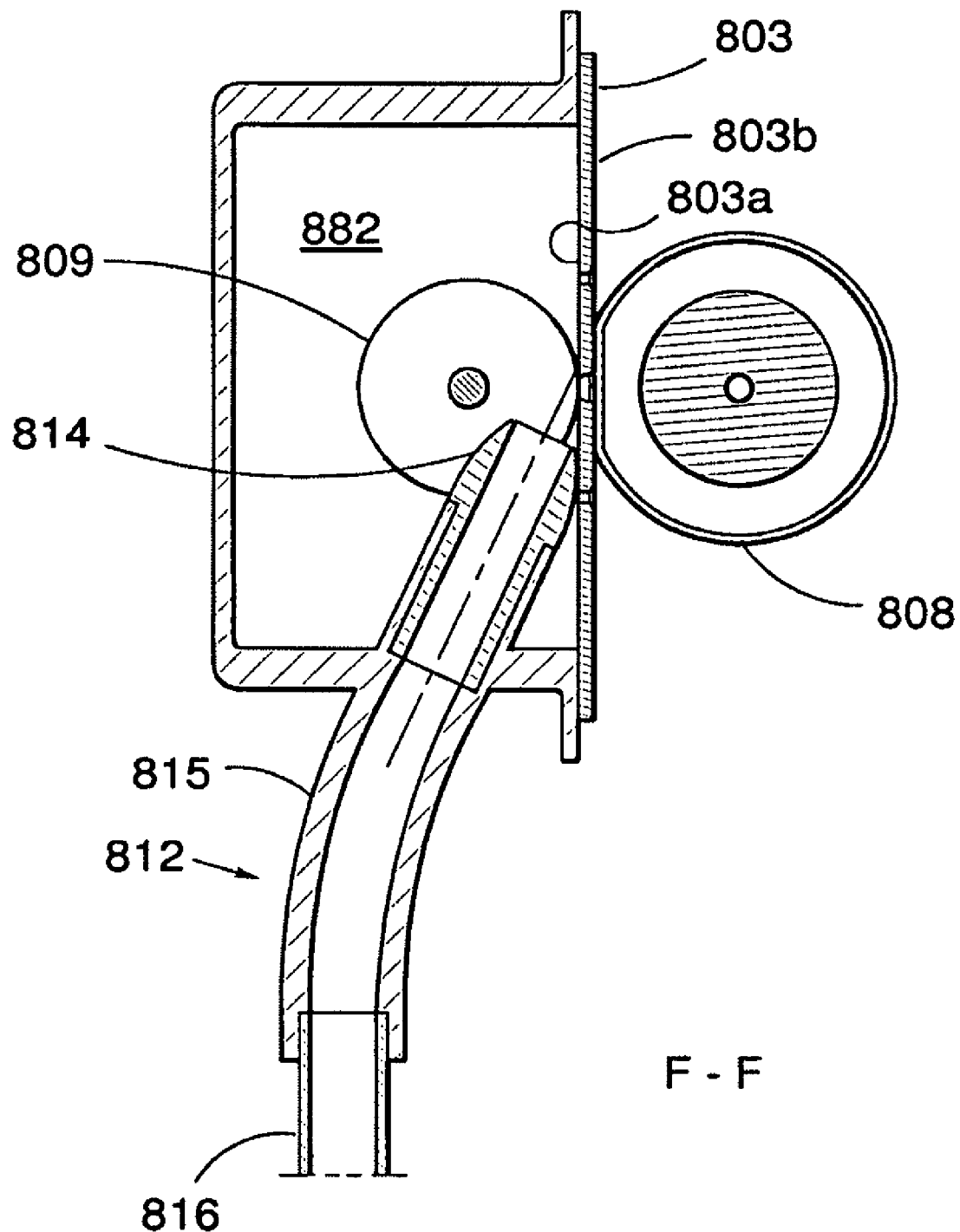
FIG. 7b shows a vertical section F-F, perpendicular to the direction of travel of the planter, of the second embodiment of the seed metering device in FIG. 6.

FIG. 6, FIG. 7*a* and FIG. 7*b* show three sections of the second embodiment. FIG. 6 is a section D-D in FIG. 7*a*. FIG. 7*a* is a section E-E in FIG. 6. FIG. 7*b* is a section F-F in FIG. 6. This second embodiment demonstrates a special case of the first embodiment where the first angle V1 of the seed metering element 803 is 90°, which means that the seed metering element 803 is in the form of a seed metering disc.

Furthermore, the second angle V2 is 0°. Accordingly, the inlet 814 of the seed metering line is directed essentially in a tangential plane in relation to the pitch circle 811 of the seed-carrying holes 804. The inlet direction 821 of the seed metering line extends in a vertical plane and has furthermore a third angle V3 in relation to the surface of the seed metering element in the reception area 818 of approx. 30°. An interval of the third angle V3 between 10° and 50° has turned out to be favourable and preferably within an interval between 20° and 40°, and most preferably essentially 30°. According to the second embodiment, the reception area 818 and thereby also the inlet 814 are essentially flush with the rotation axis 805 of the seed metering element.

This second embodiment has also a supporting roll 809, beside the inlet 814 of the seed metering line on the seed-carrying side 803*a* of the seed metering element. Said supporting roll constitutes a support to the seed metering element 803 and an abutment of the force that the pressure equalizing means 808, here in the form of a roll, applies to the outside 803*b* of the seed metering element in order to shut off the holes in the seed metering element. The supporting roll 809 has also a secondary function to hold the seed-carrying side 803*a* of the seed metering element as close as possible to the inlet 814 of the seed metering line without the seed metering element 803 contacting the inlet 814.

The seed metering device 8 may also have means for agitation of the seed volume 92 in the lower part of the seed metering device in order to facilitate the reception of seeds on the seed metering element 803, which is not shown here. The seed metering device 8 has a partition wall 810.

Figure 8:
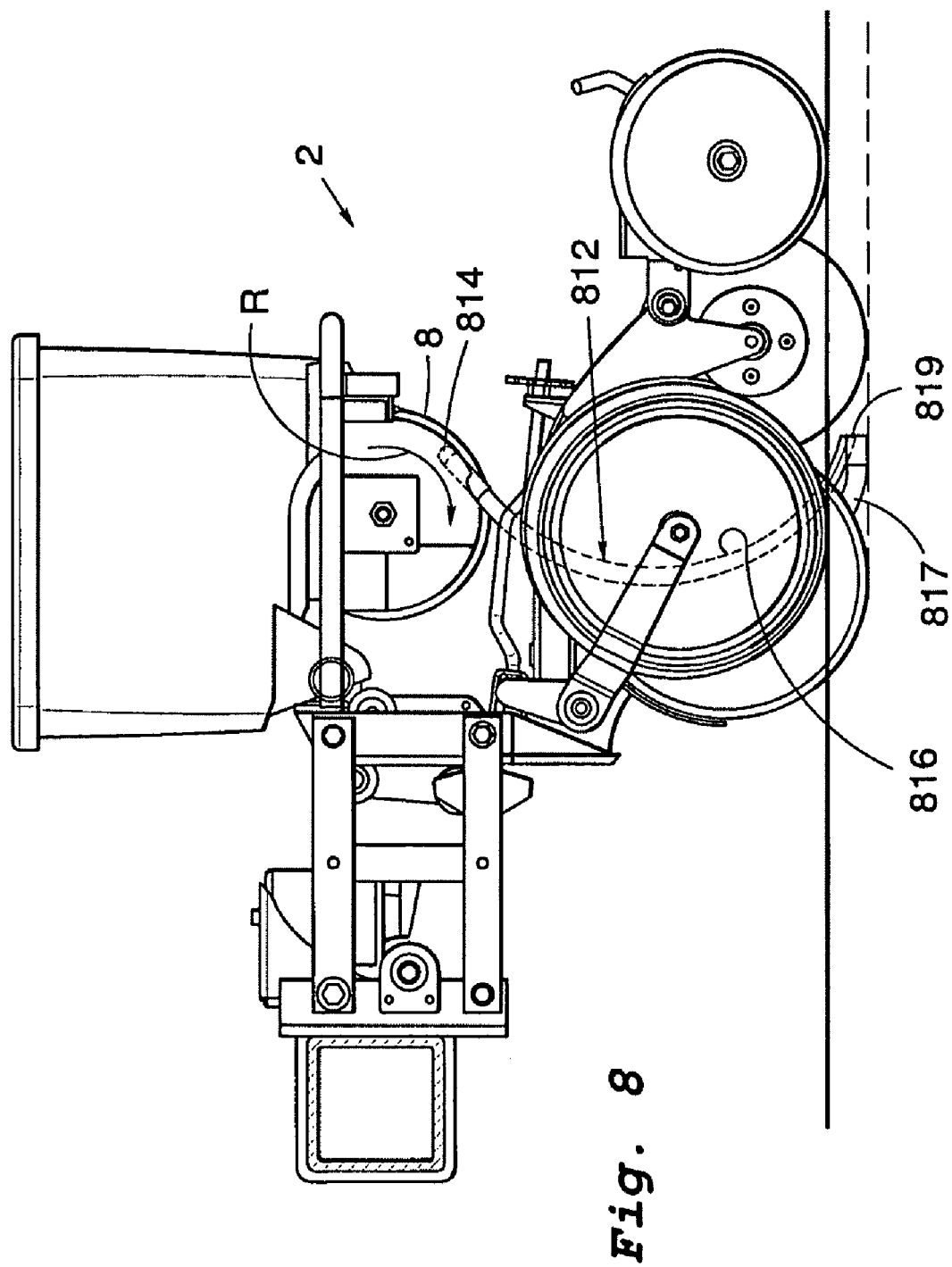
FIG. 8 shows a side view of a drilling unit comprised in the planter in FIG. 1 having a third embodiment of a seed metering device.

FIG. 8 shows a third embodiment of a seed metering device 8 comprised in the drilling unit 2. This embodiment has an opposite direction of rotation R of the seed metering element in comparison with the other embodiments. Furthermore, the inlet 814 of the seed metering line is placed under the rotation axis 805 of the seed metering element. In doing so, the seed metering line becomes shorter as well as can be formed with a uniform, or less varied, bend radius, in essentially the entire length thereof.

The seed line 816 has an arc-shape in a plane in the entire length thereof. The arc-shape may have a constant bend radius in the entire length thereof or a continuously altered bend radius in the entire length thereof.

The entire seed metering line 812 has a fixed arc-shape in relation to the supporting device 21 and seed metering device 8 of the drilling unit 2.

The driving device, not shown, may according to prior art consist of, for instance, a hydraulic motor or a supporting wheel that, via a chain transmission or flexible shafts, drives a number of seed metering devices, or the driving device may alternatively consist of one electric motor on each seed metering device. The driving device is, also according to prior art, arranged so that the speed of rotation of the seed metering element 803 around the seed metering shaft 805 increases as the speed of the agricultural machine increases, and vice versa.

The angles indicated in the description are given only as numbers without distinction of direction.

The invention may be varied in a number of different ways within the scope of the claims. For instance, embodiments that are combinations of the embodiments accounted for here may occur.

Furthermore, the first angle V1 may be all the way down to 0°, so that the outer part of the seed metering element becomes parallel to the rotation axis and that the seed-carrying surface thereof describes a cylindrical inner or outer envelope surface. The latter case allows an as small as possible change of direction of the seed into the inlet.

The invention claimed is:

1. An agricultural machine comprising:
   a structural member;
   a pressure-creating member; and
   at least one drilling unit comprising:
      a support device and a seed metering device to distribute seeds to a drill furrow in the ground across which the agricultural machine moves,
   wherein the drilling unit is movably connected with the structural member,
   wherein the seed metering device is fixedly connected with the support device of the drilling unit,
   wherein the seed metering device comprises a chamber for seeds and a seed metering element
   wherein, by means of a driving device, the seed metering element is arranged to transport seeds to a seed metering line,
   wherein the chamber is arranged to be supplied with a positive pressure from the pressure-creating member
   wherein the seed metering element constitutes a wall limiting the chamber,
   wherein the wall is arranged with,
   wherein the holes connect the chamber with the surroundings to attach and transport seeds at said holes of the seed metering element by the pressure difference developed hereby, and
   wherein the seed metering line has an inlet in the chamber creating an air flow for the transportation of the seeds from the chamber through the seed metering line to the drill furrow by said positive pressure in the chamber.

2. The agricultural machine according to claim 1, wherein the inlet of the seed metering line is arranged in connection to a reception area on a seed-carrying side of the seed metering element.

3. The agricultural machine according to claim 2, wherein the seed metering line has an inlet direction that has a third angle (V3) to a plane, which plane is tangent to the seed-carrying side of the seed metering element in the middle of the reception area, which third angle (V3) is within an interval between 10° and 50°.

4. The agricultural machine according to claim 3, wherein the third angle (V3) is within an interval between 20° and 40°.

5. The agricultural machine according to claim 4, wherein the third angle (V3) is essentially 30°.

6. The agricultural machine according to claim 2, wherein a second angle (V2) between the inlet direction of the seed metering line projected on a plane that is tangent to the seed-carrying side of the seed metering element in the middle of the reception area and a line in said plane, which line is tangent to a pitch circle, is within an interval between 0° and 30°.

7. The agricultural machine according to claim 6, wherein the second angle (V2) is essentially 0°.

8. The agricultural machine according to claim 1, wherein the seed metering element has a rotationally symmetrical shape around a rotation axis, and wherein the holes are distributed equidistantly from each other along a pitch circle concentric with the rotation axis.

9. The agricultural machine according to claim 1, wherein the seed metering element has a portion in which the holes are arranged, the cross-section of which has a first angle (V1) to the rotation axis at a pitch circle, which first angle (V1) is within an interval between 45° and 135°.

10. The agricultural machine according to claim 9, wherein the first angle (V1) is essentially 90° and the seed metering element consists of a seed metering disc.

11. The agricultural machine according to claim 1, wherein the seed metering device has a pressure equalizing means at a reception area to eliminate the pressure difference across the holes at the reception area, and thereby also the force trapping the seed, and
   wherein the seed metering device further includes a supporting roll on the seed-carrying side of the seed metering element to support the seed metering element and counteract the compressive forces that the pressure equalizing means applies to the outside of the seed metering element.

12. The agricultural machine according to claim 1, wherein the seed metering device has a supporting roll on the seed-carrying side of the seed metering element to prevent the seed-carrying side of the seed metering element from contacting the inlet of the seed metering line.

13. The agricultural machine according to claim 1, wherein the inlet of the seed metering line is arranged essentially flush with a rotation axis of the seed metering element.

14. The agricultural machine according to claim 1, wherein the inlet direction of the seed metering line essentially extends in a vertical plane.

15. The agricultural machine according to claim 1, wherein the seed metering line has an inlet and an outlet that are fixed in relation to each other.

16. The agricultural machine according to claim 1, wherein the seed metering line has a fixed arc-shape in relation to the supporting device and seed metering device of the drilling unit.

17. The agricultural machine according to claim 1, wherein the seed metering line consists of an inlet portion, an outlet portion, and a seed line, wherein the seed line has an arc-shape in a plane in the entire length thereof.

18. The agricultural machine according to claim 17, wherein the seed line has an arc-shape in a plane with a constant bend radius in the entire length thereof.

19. The agricultural machine according to claim 17, wherein the seed line has an arc-shape in a plane with a continuously altered bend radius in the entire length thereof.

* * * * *